June 26, 1956  C. M. RYERSON  2,752,564
APPARATUS FOR DETECTING A MAGNETIC FIELD
Filed Oct. 17, 1955  4 Sheets-Sheet 1

June 26, 1956 C. M. RYERSON 2,752,564
APPARATUS FOR DETECTING A MAGNETIC FIELD
Filed Oct. 17, 1955 4 Sheets-Sheet 3

United States Patent Office 2,752,564
Patented June 26, 1956

2,752,564
APPARATUS FOR DETECTING A MAGNETIC FIELD

Clifford M. Ryerson, Washington, D. C., assignor to the United States of America as represented by the Secretary of the Navy Original application January 14, 1947, Serial No. 722,016, now Patent No. 2,727,206, dated December 13, 1955. Divided and this application October 17, 1955, Serial No. 544,622

7 Claims. (Cl. 324—43)

(Granted under Title 35, U. S. Code (1952), sec. 266)

This invention relates to a new and improved apparatus for detecting and measuring a magnetic field. More specifically, the invention contemplates an arrangement in which a current is derived proportional to the strength of the field to be measured. A second magnetic field is then generated from the derived current and superimposed upon the field to be measured, the second field being substantially equal in magnitude and opposite in sign to the field to be measured, whereby substantially complete neutralization of the first field is obtained, the magnitude of the current giving an indication of the strength of the generated field and hence of the field which it was desired to measure.

This application is a division of my copending application, Serial No. 722,016, filed January 14, 1947, now Patent No. 2,727,206.

One of the objects of the invention is to provide new and improved apparatus for detecting and measuring a magnetic field.

Another object is to provide new and improved field measuring apparatus employing the method of generating a neutralizing electromagnetic field equal in magnitude and opposite in sign to the field to be measured, and registering the current required to set up the generated field, thereby to obtain an indication of the strength of the field.

Still another object is to provide a new and improved magnetometer employing automatic neutralization of the field to be measured.

Still another object is to provide a new and improved circuit for a feedback magnetometer whereby the detector coil is also utilized for generating a neutralizing field.

A further object is to provide an automatic null method of measuring a magnetic field.

A further object is to provide a new and improved amplifier circuit for use in a feedback magnetometer.

Still a further object is to provide a new and improved rectifier arrangement for deriving from an amplified A.-C. voltage a D.-C. neutralizing current proportional to the strength of the field to be measured.

Still a further object is to provide a circuit for obtaining a relatively large D.-C. neutralizing current whereby a neutralizing coil of a few turns may be used.

Other objects and advantages of the invention will be apparent after a study of the specification and drawings, in which.

Figure 1:
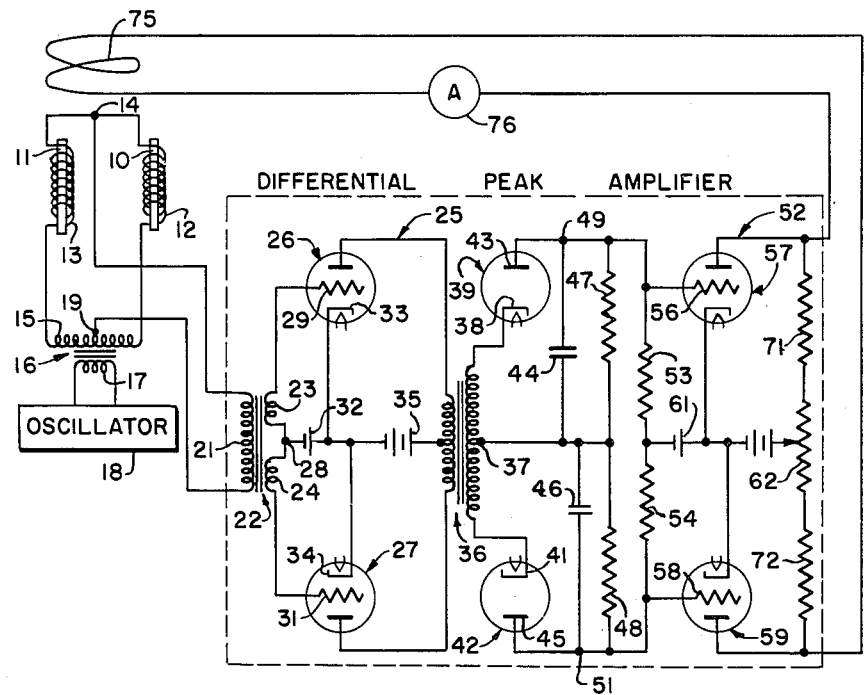
Fig. 1 is a schematic circuit diagram of a basic embodiment claimed in my copending application, Serial No. 544,621, filed October 17, 1955, of the device.

Referring now to the drawings, and more particularly to Fig. 1 thereof, the magnetic field responsive means comprises two substantially parallel cores 10 and 11 upon which two similar coils 12 and 13 respectively are arranged to constitute a reactance device. Although the cores may be made of any suitable magnetic material, they are preferably made of material having an extremely high permeability such, for example, as the magnetic alloy sold on the market under the trade name of Permalloy. The coils 12 and 13 are connected so as to have one end of each of the coils joined together at 14, the other ends of the coils being connected to the respective ends of the secondary winding 15 of a transformer 16. The primary winding 17 is connected to an oscillator 18, the oscillator supplying a frequency of the order of eight hundred cycles per second to the primary winding 17. The secondary winding 15 of the transformer has a center tap 19 which is connected to the point 14 through primary winding 21 of the transformer 22.

It will be noted that the elements so far described constitute a bridge circuit with the coil 12 as one arm, the coil 13 as a second arm and the left and right halves of the transformer secondary 15 as the third and fourth arms respectively. The transformer 22 supplies a voltage representative of the state of balance of the bridge to an alternating current amplifier 25 comprising two electronic tubes 26 and 27. The transformer 22 has secondary windings 23 and 24 which are joined together at 28, the other end of the secondary winding 23 being connected to the grid 29 of the tube 26, while the other end of the secondary winding 24 is connected to the grid 31 of the tube 27. A battery 32 biases the two grids 29 and 31 with respect to their cathodes 33 and 34 respectively. The anodes of the tubes 26 and 27 are supplied with a voltage from a source 35, the output from the anodes of the tubes 26 and 27 being fed to the primary winding of a transformer 36. The secondary winding of the transformer 36 is provided with a mid-tap 37, one end of the transformer secondary winding being connected to a rectifying device such, for example, as the cathode 38 of a rectifier tube 39 and the other end of the transformer secondary winding being connected to a similar rectifying device such as the cathode 41 of a rectifier tube 42. The anode 43 of the tube 39 is connected to one plate of a condenser 44 whereas the other plate of the condenser is connected to the mid-tap 37. The anode 45 of the tube 42 is connected to one plate of the condenser 46, the other plate of this condenser being also connected to the mid-tap 37. In parallel with the condensers 44 and 46 are respectively connected a pair of resistors 47 and 48. The rectifier tube 39, the condenser 44 and resistor 47 comprise a peak voltmeter circuit for the positive half cycles of the voltage supplied to the transformer 36, the rectifier tube 42, the condenser 46 and resistor 48 performing a similar function with respect to the negative half cycles of the voltage.

The values of the circuit components in each of these voltmeter circuits are so adjusted that the charging rate of each of the condensers respectively through the associated rectifier is sufficiently rapid so that it will substantially follow the instantaneous value of the alternating voltage impressed across the rectifier and condenser when the voltage has the proper sign. Each condenser discharges through the associated resistor which is of relatively large value and is so proportioned that the discharge rate will be low compared to a cycle of the impressed voltage and thus the voltage across each condenser will be substantially the peak voltage for whichever half of the cycle is passed by the associated rectifier. Since the condensers 44 and 46 are connected with the voltages in opposition, a differential voltage will appear across the points 49 and 51 which will be substantially proportional to the difference in the peak voltages of the positive and negative half cycles. This differential voltage is supplied to an amplifier 52 through a resistance coupling comprising resistances 53 and 54. One end of the resistance 53 is connected to the grid 56 of an amplifying tube 57 and one end of the resistance 54 is similarly connected to the grid 58 of an amplifying tube 59. The opposite ends of both of the resistors are connected together and to a bias source 61. The cathodes of the tubes 57 and 59 are connected to each other and to the bias source 61 in any conventional manner. The anodes of the tubes 57 and 59 are connected to an output circuit including resistances 62, 71, and 72 in parallel with meter 76 and coil 75. The variable resistor 62 may be employed as a balancing means and a zero adjuster for the indicating instrument 76.

The operation of the system so far described is as follows:

The coils 12 and 13, as heretofore stated, are elements of a bridge circuit which comprises these coils and the secondary winding 15 of the transformer 16, the oscillator 18 serving to energize the bridge circuit. The output terminals of the bridge circuit comprise the points 14 and 19. The coils are so connected in the bridge circuit that at any instant the fluxes set up in the cores by the currents flowing respectively through the coils are in opposite directions, and thus, when a substantially steady direct flux passes through the cores 10 and 11 due to the earth's magnetic field or any other field which it is desired to measure, this direct flux is superimposed upon the alternating fluxes in the cores so that during one half cycle it adds to the flux in one of the cores and concurrently therewith opposes the flux in the other core, while during the next succeeding half cycle the flux to be measured opposes the flux in the said one of the cores and adds to the flux in the said other of the cores.

Figure 5:
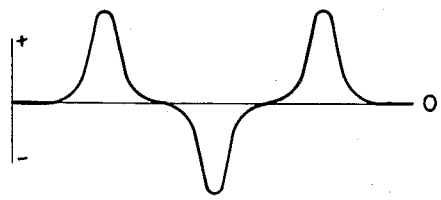
Figs. 5, 6, 7 and 8 are explanatory characteristic curves which serve to illustrate the operation of the system.
Figure 6:
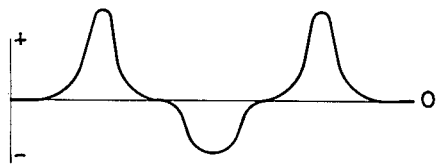

The coils are so wound that the cores are operated through saturation during each half cycle of the voltage wave. Therefore, in the presence of a field to be measured, saturation is reached sooner during one half cycle in each of the cores than during the next succeeding half cycle in the same core. As a result of this the waveform of the output circuit voltage of the bridge is rendered unsymmetrical about its zero axis; that is, one half cycle of the wave, for example, the positive half cycle, is steeply peaked whilst the succeeding half cycle is noticeably flattened as shown in Fig. 6. This figure may be compared with the curve in Fig. 5 which shows the voltage wave when substantially no external flux passes through the cores 10 and 11 and the bridge is substantially balanced. It may here be pointed out that, whether the voltage wave is symmetrical as in Fig. 5 or unsymmetrical as in Fig. 6, the area under the positive half cycle is substantially equal to the area under the negative half cycle of the wave. If the steady direct flux which is to be meaured is in the opposite direction to that which produced the curve of Fig. 6, the core which was saturated by the positive half cycle is now saturated later than the other core so that the voltage wave is rendered unsymmetrical about its zero axis in the manner indicated in Fig. 7 and the negative half cycle is sharply peaked, the positive half cycle being flattened. It will be noted by comparing Figs. 6 and 7, that the peaks in these voltage waves are on opposite sides of the zero axis in the respective figures and the areas under the positive and negative half cycles are substantially equal.

Figure 7:
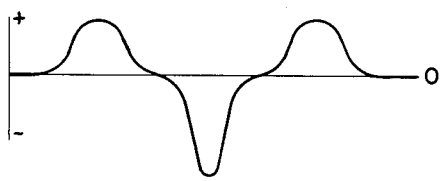

Returning to Fig. 1, it will be seen that a voltage having either the characteristics of Fig. 6 or Fig. 7 appears across the points 14 and 19 of the bridge 20 when a field in one direction or the other respectively is measured. The amplifier 25 is connected so as to amplify this voltage wave although the amplifier may be omitted or it may have as many stages as required. The amplified voltage wave is applied to the network including the rectifier tubes 39 and 42 and the rectifier tube 39 will rectify the positive half cycles of the voltage wave whereas the rectifier tube 42 will rectify the negative half cycles of the voltage wave. As pointed out above, the tube 39 charges the condenser 44 and the constants of this circuit are so adjusted that the charging rate of the condenser will substantially follow the instantaneous peak values of the positive half cycle voltage impressed across the rectifier. This is likewise true of the condenser 46 except that this condenser is charged to the peak values of the negative half cycles of the voltage.

The condenser 44 discharges through its discharge resistor 47 at a rate which tends to maintain the voltage on the condenser 44 substantially at the peak voltages of the respective positive half cycles. The resistor 48 performs the same function with respect to the condenser 46. The condensers 44 and 46 are connected so that the voltage across the points 49 and 51 is equal to the difference in the peak voltages of the positive and negative half cycles of the voltage. This differential voltage is amplified by the amplifier 52 which may have as many stages as desired.

Disposed adjacent the pick-up coils 12 and 13 is the additional coil winding 75 having its axis parallel to the axes of the coils 12 and 13 and substantially symmetrically spaced with respect thereto. The coil 75 is adapted to be energized by direct current from amplifier 52, thereby to generate an electromagnetic field having its main axis in alignment with the steady component of the field to be measured lying along the longitudinal axes of cores 10 and 11. Coil 75 is so connected to amplifier 52 that the polarity of the field generated by coil 75 is such as to oppose or neutralize the field to be measured. If sufficient amplification is available in amplifier 52, the field generated by coil 75 will be sufficient to substantially completely neutralize the field to be measured, in which case the generated field and the field which it was desired to measure will be substantially equal in magnitude, and the strength of the generated field will be an indication of the strength of the original or neutralized field.

To provide an indication of the strength of the generated field, a meter 76 is provided in series with coil 75 to indicate the strength of the current flowing therein. By suitable calibration, as will be obvious to those skilled in the art, the current scale of meter 76 may be calibrated in suitable units of field strength such, for example, as gauss.

The direction of the current flow in coil 75 will be an indication of the direction or polarity of the magnetic field. Hence, if desired, the meter 76 may be of the type in which the zero reading thereof falls in the center of the scale.

Figure 2:
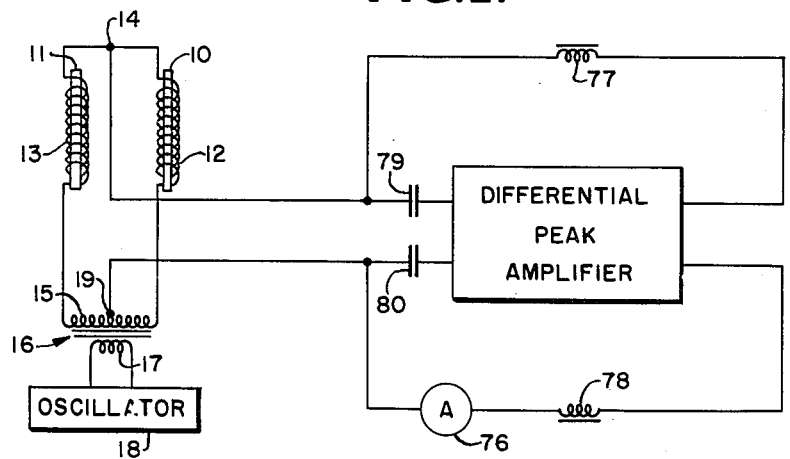
Fig. 2 is a schematic diagram partly in block form of the circuit of Fig. 1 as modified to utilize the detector coils to generate the neutralizing field.

Reference is made now to Fig. 2, in which an arrangement similar to Fig. 1 is shown, but in which the neutralizing current from amplifier 52 flows through the detector or pick-up coils 12 and 13. The output leads from the amplifier are connected to the input leads, the output leads having disposed therein choke coils 77 and 78 for preventing the alternating current from the detector bridge from flowing into the output circuit of the amplifier. The input leads to the amplifier have disposed therein capacitors 79 and 80 for preventing the D. C. output of the amplifier from getting into the input circuit thereof.

In the operation of the circuit of Fig. 2, connections are made so that the output current from the amplifier flows through coils 13 and 12 in directions to generate fields neutralizing or opposing the field to be measured. As before, the meter 76 indicating the D. C. current gives an indication of the strength and direction of the generated field, thereby providing an indication of the strength and direction of the field to be measured.

Figure 3:
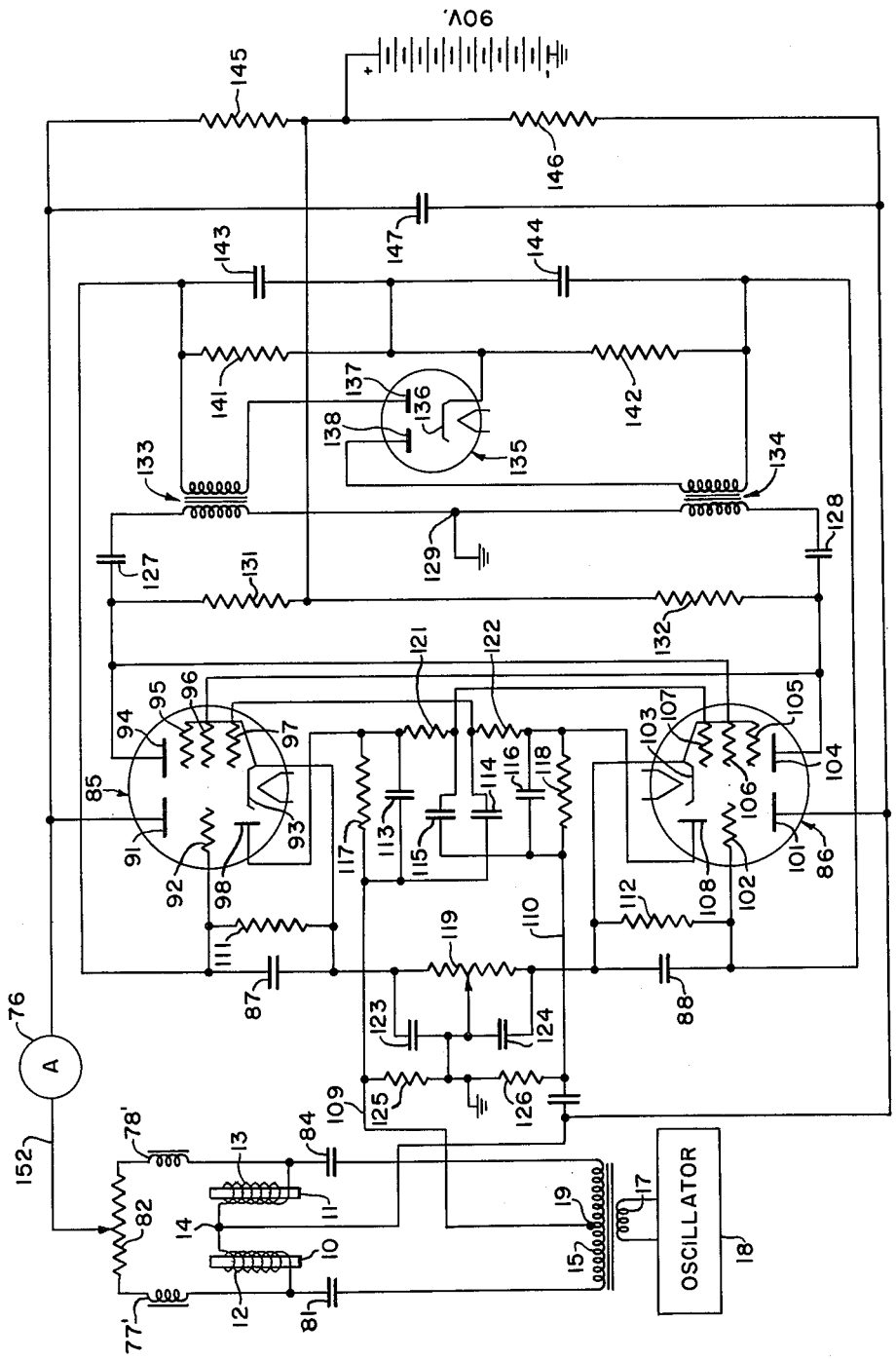
Fig. 3 is a schematic circuit diagram of an improved amplifier and rectifier circuit suitable for use with the bridge arranged detector coils of Fig. 1.

Reference is made now to Fig. 3 which shows a second embodiment of the invention, in which the pick-up bridge is generally similar to that of Fig. 1.

In Fig. 3 however, the leads between the transformer secondary 15 and the pick-up coils 12 and 13 have disposed therein blocking condensers 81 and 84 respectively for preventing the aforementioned D. C. neutralizing current applied to the detector coils from flowing through the secondary winding, the condensers being of substantially equal capacitance. In parallel with the pick-up coils of the bridge is a neutralizing feed circuit comprising the two chokes or inductors 77' and 78' having disposed therebetween a balancing potentiometer 82, the arm of the potentiometer being connected with the output circuit of an amplifier for supplying neutralizing current to the detector coils, in a manner to be subsequently more fully explained.

Two vacuum tubes 85 and 86 of the amplifier are each triple section tubes having a diode, a triode, and a pentode section, the diode section of tube 85 comprising cathode 93 and plate 98, the triode section comprising cathode 93, grid 92, and anode 91, the pentode section comprising cathode 93, grids 97, 96, and 95, and plate 94. Tube 86 has a diode section comprising cathode 103 and plate 108, a triode section including cathode 103, grid 102, and plate 101, and a pentode section including cathode 103, grids 107, 106, and 105, and plate 104. Whereas multi-function tubes are shown, it is understood that separate tubes could be used if desired to supply the various sections.

The diode sections are so connected as to supply differential bias to the control grids of the pentode sections, whereby the pentode which amplifies one half cycle of the output voltage from the detector bridge has a bias thereon proportional to the amplitude of the other half cycle of the output voltage.

As was previously mentioned, the pick-up or detector bridge, when in the presence of an external field, has, due to the fact that the cores saturate sooner on one half cycle of the exciting voltage than they do on the other, an output voltage of unsymmetrical waveform in which the peak amplitude attained by one half cycle is greater than the amplitude reached by the other half cycle. As beforementioned, Figs. 6 and 7 show the bridge output voltage in the presence of an external field, the half cycle having the greatest amplitude being determined by the direction of the steady field.

The input circuits of the diodes and pentodes are combined, to secure the beforementioned differential bias operation, the circuits being traced as follows: One of the output leads 110 from the bridge has therein a D. C. blocking condenser 83. On the amplifier side of this condenser, a pair of resistances 125 and 126 are connected between from leads 109 and 110 respectively to ground. The two cathodes 93 and 103 have connected therebetween a balancing potentiometer 119 having bypass condensers 123 and 124 connected from the arm to the ends thereof, the arm being connected to ground. The potentiometer, in addition to supplying balancing means, may provide a steady component of bias for the two pentode sections.

Connected in each of the output leads 109 and 110 from the detector bridge is a storage R-C network, comprising in lead 109, the resistance 117 in parallel with condenser 113, and in lead 110, the resistance 118 in parallel with condenser 116, resistance 117 being connected to diode plate 98 and resistance 118 being connected to diode plate 108. Further connections of the input circuits are a connection including resistance 121 between the diode plate 98 of tube 85 and the grid 107 of tube 86, and a connection including resistance 122 between diode plate 108 of tube 86 and grid 97 of tube 85. A coupling condenser 114 connects lead 109 to grid 97 of tube 85, and a coupling condenser 115 connects lead 110 to grid 107 of tube 86.

Assume now by way of description that the detector coils are excited from source 18 and placed in an external field whereby an output voltage similar to that of Fig. 6 is developed across leads 109 and 110, the leads being so connected that the instantaneous positive half cycles of Fig. 6 are applied to lead 110. For the reason that the center tap of resistances 125 and 126 is grounded, and the cathodes 93 and 94 are grounded through potentiometer 119, the upper half cycles of Fig. 6 will tend to make plate 108 positive with respect to cathode 103 whereas the lower half cycles of the wave of Fig. 6 will tend to make diode plate 98 positive with respect to cathode 93. Upon the application of a positive voltage to plate 98, a current flows between it and cathode 93, the current flowing through resistance 117 and developing a voltage thereacross which charges condenser 113.

By proper choice of component values for resistance 117 and condenser 113, an arrangement may be provided in which the charging rate of the condenser is sufficiently rapid so that it will follow the instantaneous value of the peak A. C. voltage impressed thereacross, in this case, the voltage of the lower half cycles of Fig. 6, the diode and R-C network acting as a peak voltmeter in which the rectified voltage is developed across the series resistance 117.

Similarly, the diode section of tube 86 conducts during the upper half cycles of Fig. 6, developing a voltage across condenser 116 proportional to the peak value of the half cycle. The directions of current flow are such that the right hand plates (Fig. 3) of condensers 113 and 116 are charged negatively.

The voltage developed across condenser 113 by the diode of tube 85 is applied through resistance 121 as a negative bias on grid 107 of tube 86, the grid return circuit to cathode being traced as follows: grid 107 through resistances 121, 117, and 125 to ground and thence through potentiometer 119 to the cathode of tube 86. Similarly, the voltage developed by the diode of tube 86 across the condenser 116 is applied through resistance 122 to grid 97 of tube 85, the grid return circuit being traced as follows: grid 97 through resistances 122, 118, and 126 to ground and thence through potentiometer 119 to the cathode of tube 85.

The control grid 97 of the pentode section of tube 85 thus has a bias applied thereto proportional to the peak amplitude of the upper half cycles of Fig. 6, whereas the control grid 107 of tube 86 has a bias applied thereto proportional to the peak amplitude of the lower half cycles of Fig. 6. However, the control grid 97 of tube 85 is coupled through condenser 114 to lead 109, and has the lower half cycle of Fig. 6 applied thereto as a positive potential, whereas the control grid 107 of tube 86 is coupled through condenser 115 to lead wire 110, whereby the upper half cycle of Fig. 6 is applied to grid 107 as a positive potential. It is apparent then, that differential amplification is obtained in the pentode sections, the section which has the half cycle of greatest magnitude applied thereto in a positive direction also having a bias thereon proportional to the half cycle of lowest magnitude, whereas the pentode section adapted to amplify the half cycle of smallest amplitude has a bias applied thereto proportional to the peak voltage of the half cycle of greatest amplitude. The differential amplification can be enhanced if desired, by the use of a tube having a variable amplification factor, for example, a variable mu pentode.

The plates 94 and 104 of tubes 85 and 86 respectively are connected through blocking condensers 127 and 128 respectively to the primaries of a pair of output transformers 133 and 134 respectively having the other ends of the primary windings grounded at 129. Between the plates 94 and 104 are connected in series resistances 131 and 132, the common point between resistances being connected to a suitable source of plate potential. The outputs of the pentode sections are, accordingly, delivered to the respective output transformers.

It is observed that the plate 104 of tube 86 is connected to the screen grid 96 of tube 85, and that the plate 94 of tube 85 is connected to the screen grid 106 of tube 86. As will be understood by those skilled in the art, these connections provide an arrangement in which the gain of tube 85 is modified by the intensity of the signal amplified by tube 86, an increase in the amplitude of the signal applied to tube 86 resulting in an increase in plate current in that tube, and a fall in the plate voltage thereof and in the screen voltage of the other tube, thereby causing a reduction in the gain of tube 85 and a corresponding reduction in output. Similarly, the gain of tube 86 is modified by the intensity of the signal amplified by tube 85, an increase in the amplitude of the signal applied to tube 85 resulting in a reduction in the gain and output of tube 86. There is provided then, additional differential action supplementing the aforedescribed differential bias.

The double diode tube 135 has the plates 137 and 138 thereof connected to one end of the secondary windings of output transformers 133 and 134 respectively, the other ends of the secondaries being connected through resistances 141 and 142 respectively to cathode 136, resistances 141 and 142 being paralleled by condensers 143 and 144 respectively. Thus, this circuit provides an arrangement whereby, if the circuit constants are chosen properly, a rectified voltage is developed across condenser 143 proportional to the peak voltage output of transformer 133, and a rectified voltage is developed across condenser 144 proportional to the peak voltage output of transformer 134.

The triode sections of tubes 85 and 86 are connected as D.-C. amplifiers, the rectified output from diode plate 137 and transformer 133 being applied to grid 92, the rectified output from diode plate 138 and transformer 134 being applied to grid 102. The grid cathode circuit of grid 92 includes resistance 111 in parallel with condenser 87, and the grid cathode circuit of grid 102 includes resistance 112 in parallel with condenser 88. It is noted that there is a complete electrical circuit for the passage of direct current, this circuit being traced as follows: from resistor 141 through resistance 111, through potentiometer 119, resistance 112, and thence through resistance 142 to the other end of resistance 141. The diode sections of tube 135, in conjunction with the triode sections of tubes 85 and 86, constitute a differential peak amplifier generally similar to that disclosed in Fig. 1 and embracing tubes 39, 42, 57, and 59 therein. The plates 91 and 101 of the respective triode sections are connected as shown to two resistances 145 and 146 having the other ends thereof connected together and to a suitable source of plate energizing potential with the condenser 147 connected between plates. The plates 91 and 101 are also connected by leads 152 and 151 respectively to the arm of potentiometer 82 and to the center point 14 of the detector coils respectively. Lead 152 has the meter 76 therein for indicating the value of the neutralizing current.

The operation of the circuit of Fig. 3 will be readily understood in view of descriptions aforegiven of the operation of the circuits of Figs. 1 and 2. The application of a signal to the aforedescribed input circuit causes a D.-C. current to flow through the leads 151 and 152, and pick-up coils 12 and 13, the direction of flow depending upon which channel including the pentode sections has the signal or half cycle of greatest peak amplitude applied thereto. By suitable choice of circuit connections, the fields generated in the pick-up coils by the D.-C. current therein may be made of proper polarities to oppose the field to be measured. Provided sufficient gain is available in the amplifiers, substantially complete neutralization of the field to be measured may be obtained, the direction and amount of D.-C. current flow as registered on meter 76 giving an indication of the direction and magnitude of the generated field and hence of the field which it was desired to measure.

Figure 4:
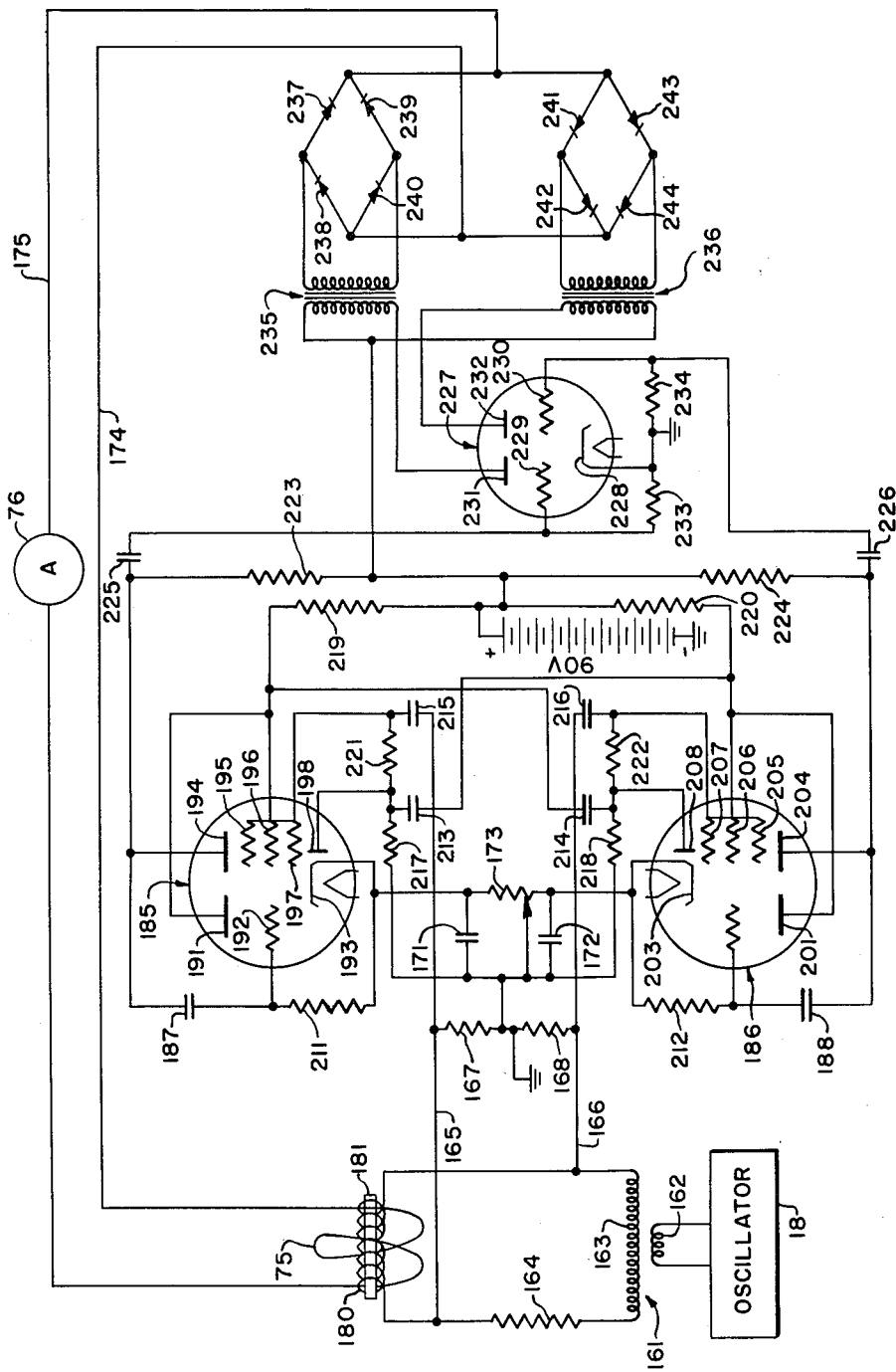
Fig. 4 is a schematic circuit diagram of a second embodiment of the invention in which a single pick-up or detector coil is used.

Reference is made now to Fig. 4, which shows a feedback magnetometer employing a single pick-up or detector coil, and a modified amplifier circuit somewhat similar to that of Fig. 3, and suitable for developing a neutralizing current from the signal generated in the single coil. The oscillator 18 delivers its output to a transformer 161 having primary winding 162 and secondary winding 163. The output of the transformer, which should be of substantially pure waveform for reasons heretofore explained, is delivered through series resistance 164 to the pick-up coil 180 having a saturable core 181.

Figure 8:
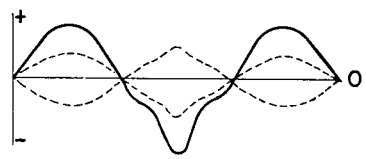

As previously explained, when a saturable core is driven to saturation periodically by an alternating current of substantially sinusoidal waveform, harmonics are introduced in the waveform of the exciting current. If there is a steady component of a magnetic field along the axis of the core, this component will oppose the saturating field during one half cycle and add to the saturating field during the other half cycle. As a result, the core will saturate sooner on one half cycle than on the other, the harmonic distortions of the wave will be different in alternate half cycles, and an asymmetry will be introduced in the waveform in which one half cycle has a peak amplitude greater than the other half cycle. Such a waveform is illustrated in Fig. 8, in which the unbroken trace represents the distortion of the exciting current produced in coil 180 due to the presence in the core of a steady component of a magnetic field. Whether the upper or lower half cycle exceeds the other in amplitude depends upon the direction of the magnetic field along the core. The presence of the resistance 164 in the circuit insures that the impedance of the generator is maintained relatively high with respect to the impedance of the load (coil 180), so that distortions of the waveform occurring in the coil appear in substantial magnitude across the input circuit of the vacuum tube amplifier.

Each of the two vacuum tubes 185 and 186 is a triple section tube, comprising a diode, a triode, and a pentode section. Tube 185 has diode elements including cathode 193 and diode plate 198, a triode section including cathode 193, grid 192, and plate 191, and a pentode section including cathode 193, control grid 197, screen grid 196, suppressor grid 195, and plate 194. Tube 186 has a diode section including cathode 203 and diode plate 208, a triode section including cathode 203, control grid 202, and plate 201, and a pentode section including cathode 203, control grid 207, screen grid 206, suppressor grid 205, and plate 204.

The output leads 165 and 166 from the detector coil 180 have connected thereacross resistances 167 and 168 in series, the common terminal point between resistances being connected to ground. The cathodes 193 and 203 of the tubes 185 and 186 are connected through potentiometer 173 having the arm thereof connected to ground and having condensers 171 and 172 connected between the arm of the potentiometer and the ends thereof respectively. The potentiometer provides means for balancing the gain of two signal channels hereafter to be described, and also provides a steady component of bias for the tubes, as will be hereafter apparent.

The output leads 165 and 166 are connected through condensers 215 and 216 respectively to the control grids 197 and 207 respectively of the pentode sections, grid return to ground from grid 197 being through resistances 221 and 217, and grid return to ground from grid 207 being through resistances 222 and 218. By reason of the voltage divider or center tap connection between resistances 167 and 168, the pentode sections of tubes 185 and 186 each acts as a signal channel for one half cycle of the output voltage of coil 180.

The plates 194 and 204 have series resistances 223 and 224 connected therebetween, the common point between resistances being connected to a suitable source of plate potential, the resistances providing loads individual to the pentode tube plates across which the outputs are developed. Condensers 187 and 188 couple plates 194 and 204 respectively to the grids 192 and 202 respectively of the triode sections, grid returns to cathode being provided by resistances 211 and 212 respectively. The signal outputs of the pentodes are amplified in the triode sections in a conventional manner. The plates 191 and 201 of the triodes are connected through series connected resistors 219 and 220, the common point between resistances being connected to a suitable source of plate potential, outputs of the triode sections being developed across these respective load resistances. Plate 191 is connected to screen grid 196 for reasons to be subsequently explained, and is coupled through condenser 214 to diode plate 208. Similarly, plate 201 is connected to screen 206 and is also coupled through condenser 213 to diode plate 198.

The circuit operates to provide differential bias for the pentode sections, thereby to provide unequal amplification for the two alternate half cycles of the input signal, depending upon which half cycle is of greater amplitude.

Referring again to Fig. 8, in which the unbroken line represents the signal from the detector coil 180, by reason of the center tap arrangement of resistances 167 and 168, at the moment a voltage of given polarity and magnitude resulting from one half cycle of the signal is applied between one pentode control grid and cathode, a voltage of equal magnitude and opposite polarity is applied to the control grid of the other pentode section, these voltages being indicated by the dashed lines of Fig. 8. As aforedescribed, the circuit provides an arrangement in which the signal applied to control grid 207 is amplified in the pentode and triode sections of tube 186 and applied through condenser 213 to the diode plate 198 of tube 185, where rectification occurs, the resulting D.-C. potential being applied through resistance 221 to grid 197. Assume now by way of description that the first half cycle of the signal voltage of Fig. 8 is applied to the voltage divider network including resistances 167 and 168 whereby grid 197 is made positive with respect to cathode at the same moment the image voltage represented by the other dashed line makes grid 207 negative with respect to cathode. The current through the pentode plate 204 decreases, raising the plate potential, causing the potential on the coupled triode grid 202 to increase, increasing the triode plate current, causing the potential on plate 201 to fall. This decrease in voltage is reflected through condenser 213 to anode plate 198, tending to diminish the rectification occurring therein. As aforementioned, by reason of the resistance 221 linking diode plate 198 and grid 197, the rectified voltage developed across resistance 217 by the diode is applied as a negative bias on grid 197. It should be noted also, that the signal voltage applied to grid 197 through condenser 215 is also applied to the diode plate 198 through resistance 221, tending to develop a rectified voltage across resistance 217, but of such limited value in comparison with the amplified voltage applied to the diode through condenser 213 that the effect of the signal voltage in developing a bias may be neglected. By proper choice of component values, it will readily be understood that conditions are provided in which the instantaneous bias on the grid 197 of the pentode is reduced proportional to the amplitude of the half cycle exciting the grid 197 of the pentode in a positive direction, resulting in an instantaneous increase in gain.

The next succeeding half cycle of the signal voltage of Fig. 8 is applied as a potential on the pentode grid 207 positive with respect to cathode or ground. Simultaneously therewith, it causes a negative potential with respect to ground to be applied on grid 197. The circuits of tube 185 operate to reduce the bias on grid 207 of tube 186 proportional to the instantaneous value of the peak voltage of the half cycle. It is apparent then, that differential amplification in the two signal channels is obtained, that channel amplifying the half cycle of greater amplitude having the greater gain. By reason of the intervening stages of amplification provided by the triode sections, the differential bias effect is magnified and enhanced.

The pentode plates 194 and 204 are also observed, Fig. 4, to be coupled through condenser 225 and 226 respectively to the control grids 229 and 230 respectively of a double triode tube 227, grid returns being provided by resistances 233 and 234 respectively, the tube having plates 231 and 232 respectively and cathode 228. After amplification in the double triode, the outputs of the plates 231 and 232 are applied to the primary windings of output transformers 235 and 236 respectively.

Each of the transformer outputs is fed to a full wave rectifier, the rectifier associated with transformer 235 comprising rectifier elements 237, 238, 239, and 240, the elements being of the copper oxide type or any other suitable type, the rectifier associated with transformer 236 comprising elements 241, 242, 243, and 244. The output terminals of the full wave rectifiers are connected to the neutralizing solenoid 75 having current indicating means 76 in circuit therewith. It will be apparent to those skilled in the art to which the invention pertains that, upon energization of the amplifier channels from coil 180, a rectified D.-C. current will flow in coil 75, the direction of current flow depending upon which full wave rectifier has the greater output, and hence upon which signal amplifier channel has the greater amplification. As before stated, this latter is determined by that signal channel having the half cycle of greater peak magnitude applied thereto. By proper circuit arrangement, the current flowing in coil 75 is made to set up an electromagnetic field opposing the field to be measured. When the generated field is of sufficient amplitude to substantially null or cancel the field which it is desired to measure, the current indicated by meter 76 will indicate the strength of the field which it is desired to measure.

Any suitable means may be provided for heating the filaments or heaters of the various tubes. Whereas triodes, pentodes, or diodes are shown, it is understood that tubes employing other arrangements of elements may be employed, the functions of the various sections remaining the same. When common plate supplies are used for the various tubes, decoupling means may be employed if desired, or separate supplies used.

It is understood that additional amplifiers may be added if desired.

Whereas the invention has been shown and described with reference to specific embodiments thereof which give satisfactory results, it is obvious that various modifications of form or structure may be made without departing from the spirit or scope of the invention, and I therefore include all such modifications and equivalents in the appended claims.

The invention described and claimed herein may be manufactured and used by or for the Government of the United States of America without the payment of any royalties thereon or therefor.

What is claimed as new and desired to be secured by Letters Patent of the United States is:

1. In a feedback magnetometer employing means for introducing asymmetries in alternate half cycles of an alternating current wave proportional to the magnitude of the field to be measured and selectively in accordance with the sign of said field, and means responsive to said asymmetries for generating a neutralizing field substantially equal in magnitude but opposite in sign to said first named field, means for amplifying the components of voltage resulting from said asymmetries and deriving a direct neutralizing current therefrom, said means comprising a pair of thermionic rectifiers for producing rectified voltages proportional respectively to the peak values of alternate half cycles of said voltage, a pair of thermionic amplifiers adapted respectively to amplify alternate half cycles of said voltage, means for differentially biasing said thermionic amplifiers from the rectified voltages developed by said rectifiers whereby the amplifier energized by one half cycle has its bias controlled by the peak value of the other half cycle, a pair of rectifier means individually energized by said amplifier tubes, and a circuit for combining the outputs of said rectifier means to obtain said neutralizing current.

2. A feedback magnetometer comprising, in combination, an electric bridge circuit including a pair of detector coils, means for supplying a periodically varying voltage having a substantially symmetrical waveform to said circuit, means responsive to a magnetic field and connected in said circuit for changing the symmetry of the waveform of said voltage to produce peak voltages on one side of the zero axis thereof which are of greater magnitude than the peak voltages on the other side of the zero axis in accordance with the strength and direction of the external field, a pair of thermionic rectifiers connected to said circuit and adapted to produce rectified voltages proportional respectively to the peak voltages on opposite sides of the zero axis, a pair of thermionic amplifier tubes each connected to said circuit and adapted to amplify selectively said peak voltages, means for differentially biasing said thermionic amplifiers from the rectified voltages developed by said rectifiers whereby the amplifier energized by the voltage on one side of the zero axis has its bias controlled by the voltage on the other side of the zero axis, a pair of rectifier means energized by said amplifier tubes, a circuit for combining the outputs of said rectifier means, a neutralizing coil disposed in predetermined relation to said detector coils and adapted to be energized by said combined outputs to generate an electromagnetic field substantially equal in magnitude and opposite in sign to the field to be measured, and means controlled by the combined outputs for indicating the magnitude of the generated electromagnetic field.

3. In apparatus of the character described for measuring the magnitude of a magnetic field, a source of voltage of substantially sinusoidal waveform, a detector energized from said source and adapted to have a component of voltage generated therein proportional to the strength of the field to be measured, said component resulting in distortions of said waveform whereby alternate half cycles are rendered of unequal peak amplitude selectively in accordance with the polarity of the field to be measured, amplifier means excited by said voltage of distorted waveform, said amplifier means including a pair of rectifiers each adapted to pass one half cycle of the exciting voltage, an R-C network associated with each rectifier for securing voltages proportional to the peak amplitudes of the half cycles of voltage passed by the respective rectifiers, push-pull vacuum tube means wherein the control grids of the tubes thereof have both the last named voltages simultaneously applied thereon in opposite senses respectively, connections between said vacuum tube means and said detector for causing a direct current flow in said detector which sets up a field opposing the field to be measured and substantially equal in magnitude, and means controlled by said current for indicating the magnitude of the generated field.

4. In apparatus of the character disclosed for measuring a magnetic field, detector means adapted to be disposed within the field, a source of voltage of substantially sinusoidal waveform connected to said detector means for exciting the same, said detector means being adapted to introduce distortions in the waveform of the exciting voltage proportional to the strength of the component of the magnetic field lying along the major axis of the detector, said distortions resulting in differences in the peak amplitudes of the alternate half cycles of the exciting current selectively in accordance with the polarity of the field, an output circuit connected to said detector means, a pair of thermionic rectifiers connected in said circuit, each of said rectifiers being adapted to rectify one half cycle of the detector output voltage in said circuit, an R-C network associated with each of said rectifiers and adapted to develop rectified voltages thereacross proportional to the peak amplitudes of alternate half cycles of the voltage respectively, a pair of thermionic amplifier tubes in push-pull arrangement and each adapted to amplify one half cycle of said detector output voltage, connections whereby the rectified voltage developed during one half cycle of the detector output voltage is applied as bias to the amplifier tube which amplifies the other half cycle respectively, a pair of rectifier means energized by said amplifier tubes, a circuit combining the outputs of said rectifier means, a neutralizing coil disposed in predetermined relation to said detector and adapted to be energized by said combined outputs to generate an electromagnetic field substantially equal in magnitude and opposite in sign to the field to be measured, and means controlled by the combined outputs for indicating the magnitude of the external field.

5. A magnetic field direction responsive system of the character disclosed, comprising, in combination, a field detector, means for supplying a periodically varying voltage having a substantially sinusoidal waveform to said detector, means associated with said detector for changing the symmetry of the waveform of said voltage to produce peak voltages on one side of the zero axis thereof which are of greater magnitude than the peak voltages on the other side of the zero axis in accordance with the direction and strength of the external field, dual amplifier means connected to said detector for separately amplifying the alternate half cycles of said voltage, dual rectifier means individually energized from said dual amplifier means for deriving two D.-C. potentials proportional to the peak amplitudes of the respective half cycles of said voltage, connections between said dual rectifier means and said dual amplifier means whereby the amplifier means passing one half cycle has its conductance altered in an amount proportional to the peak voltage of the other half cycle, a common output circuit for said dual amplifier means including second rectifier means, said second rectifier means being adapted to generate a current proportional to the strength of the field, a neutralizing coil disposed in predetermined relation to said detector and adapted to be energized by said current to produce an electromagnetic field equal in magnitude but opposite in sign to said first named magnetic field, and means controlled by said current for indicating the strength of the external field.

6. In a feedback magnetometer of the character disclosed, means for generating a signal representative of the magnitude and polarity of a magnetic field, said signal being characterized by an asymmetry in which the positive and negative half cycles with respect to the zero axis are of unequal amplitude selectively in accordance with the polarity of the field and in amounts proportional to the magnitude of the field, means for deriving two D.-C. potentials each proportional to the peak amplitude of one half cycle of said signal, dual amplifier means each adapted to amplify one half cycle of said signal, means for applying said D.-C. potentials to said dual amplifier means whereby the amplifier responsive to the half cycle of greater amplitude has a negative bias voltage applied thereto proportional to the half cycle of smaller amplitude and the amplifier responsive to the half cycle of smaller amplitude has a negative bias voltage applied thereto proportional to the half cycle of greater amplitude, and means energized from said dual amplifier means for generating a field of substantially equal magnitude and opposite polarity to the field to be measured.

7. In a feedback magnetometer of the character disclosed, means for generating a signal representative of the magnitude and polarity of a magnetic field, said signal being characterized by an asymmetry in which the positive and negative half cycles with respect to the zero axis are of unequal amplitude selectively in accordance with the polarity of the field and in amounts proportional to the magnitude of the field, dual amplifying means for separately amplifying alternate half cycles of the signal, means for individually rectifying the outputs of said dual amplifying means, circuit means for applying the rectified outputs as biases to the dual amplifying means in a manner such that the amplifier responsive to the half cycle of greater amplitude has a negative bias voltage applied thereto proportional to the half cycle of smaller amplitude and the amplifier responsive to the half cycle of smaller amplitude has a negative bias voltage applied thereto proportional to the half cycle of greater amplitude, and means energized from said dual amplifier means for generating a field of substantially equal magnitude and opposite polarity to the field to be measured.

References Cited in the file of this patent

UNITED STATES PATENTS

| | | |
|---|---|---|
| 2,406,870 | Vacquier | Sept. 3, 1946 |
| 2,661,455 | Tickner | Dec. 1, 1953 |